United States Patent [19]

Bruns

[11] 3,860,554

[45] Jan. 14, 1975

[54] SILICONE RUBBER COMPOSITION YIELDING A STRUCTURAL ASH ON COMBUSTION

[75] Inventor: Carl Newton Bruns, Adrian, Mich.

[73] Assignee: Stauffer Chemical Company, Adrian, Mich.

[22] Filed: July 23, 1973

[21] Appl. No.: 381,938

Related U.S. Application Data

[60] Division of Ser. No. 257,056, May 25, 1972, Pat. No. 3,772,239, which is a continuation of Ser. No. 749,578, Aug. 2, 1968, abandoned.

[52] U.S. Cl.............. 260/37 SB, 106/74, 106/84, 117/46 R, 117/62, 252/62, 260/46.5 G, 264/44
[51] Int. Cl............................................. C08g 51/04
[58] Field of Search ........... 106/74, 84; 260/46.5 G, 260/37 SB

[56] References Cited

UNITED STATES PATENTS

| | | | |
|---|---|---|---|
| 3,361,583 | 1/1968 | Elarde et al. | 106/65 |
| 3,549,393 | 12/1970 | Elarde | 106/65 |
| 3,772,239 | 11/1973 | Bruns | 260/37 SB |

*Primary Examiner*—Melvyn I. Marquis

[57] ABSTRACT

A silicone rubber formulation incorporating sodium metasilicate and an inorganic compound, preferably nickelous oxide, having a melting point exceeding that of sodium metasilicate. On catalytic vulcanization of the formulation, a rubber-like composition results which on combustion yields a cohesive, rigid ceramic material.

6 Claims, No Drawings

SILICONE RUBBER COMPOSITION YIELDING A STRUCTURAL ASH ON COMBUSTION

This is a division of application Ser. No. 257,056, filed May 25, 1972 and now U.S. Pat. No. 3,772,239 which is a continuation of Ser. No. 749,578, filed Aug. 2, 1968, now abandoned.

This invention relates to a silicone rubber formulation vulcanizable to yield a composition capable on combustion of converting to a ceramic material functional as a thermal barrier.

Although silicone rubbers are well known for their inherent resistance to high temperatures, at least as compared to organic rubbers both natural and synthetic, because of the demands of certain applications, much effort has been expended toward increasing this resistance. For the most part, this effort has been in the direction of additives, such as organic halo compounds which are known for their fire retardant properties and hence tend to reduce the rate of burning and/or the volume of rubber consumed incident to the burning. Conceding that these additives are reasonably effective, there still remains a temperature at which the silicone rubber, as otherwise conventionally prepared, will convert to an ash totally without structural strength or integrity and incapable of functioning to any extent as the original rubber or of affording any other beneficial effect.

The present invention is based on a concept altogether different from that of prior workers. In accordance therewith, the heat of combustion of the vulcanized rubber composition itself is utilized to produce a rigid, coherent material serving as a thermal barrier and constituting a substitute for the original composition in one or more significant respects.

There are many areas in which the invention may be practically applied. Thus, it finds application in the fabrication of seals and gaskets, particularly such of these as are designed for use in oil refineries and chemical plants. It is manifestly desirable in the event of a fire at such an establishment that the gaskets between pipe sections, for example, in the area of the fire remain functional irrespective of the temperatures to which they may be subjected.

As another specific example, use of the invention in the manufacture of safes may be mentioned. Here, the vulcanized rubber composition may be associated with the wall and door-forming members or the entire safe may be lined with such composition.

Still another application of the invention resides in its employment in the compartmentalization of aircraft so as to contain fires wherever originating. The invention contemplates inter alia articles including a substrate on which the silicone rubber is carried or with which it is integrated. In such a case, the rubber may be in either a cured or uncured state at the time it is brought into association with the substrate, which commonly is of a fibrous nature, e.g., fiber glass, asbestos, etc.

A composition conforming to the invention is distinguished in that it comprises, in admixture with a silicone gum, which may be a gel or viscous liquid, sodium metasilicate and an inorganic compound having a higher melting point than sodium metasilicate. The applicable inorganic compounds are otherwise characterized in that they are either naturally occurring or derivable from naturally occurring minerals. They may thus be indentified as "inorganic mineral compounds." In the milieu of the invention, such compounds serve in co-action with the sodium metasilicate as densifiers and structuring agents. As exemplary thereof may be mentioned: nickelous oxide (bunsenite), zinc oxide, cryolite, aluminum fluoride, manganese oxide, chromium oxide, titanium dioxide, calcined alumina, nepheline syenite, lithium aluminum silicate, fluorspar, etc. Of these, as previously indicated, nickelous oxide is preferred.

The silicone gum with which the sodium metasilicate and higher melting inorganic mineral compound are admixed may be filled or unfilled. i.e., depending on the particular application the gum may or may not incorporate reinforcing and/or nonreinforcing filler materials such as are conventionally employed in the silicone industry. If a reinforcing filler is used, various additives may also be included in the composition as, for example, diphenylsilanediol, which is operative to prevent crepe aging.

In the practice of the invention, the intermixing of the sodium silicate and inorganic mineral compound with the gum, when a gel, is generally carried out on a two-roll mill with the rolls heated as required.

As a matter of economy, it is generally in order to employ in the formulation subjected to milling a substantial quantity of a nonreinforcing filler, such as finely ground quartz. The material sold under the tradename MIN-U-SIL is applicable here. It is to be understood that such material represents merely an inert extender and that no criticality is attached thereto.

It is customary in the particular art to express the percentages of the several components of a silicone rubber formulation in parts by weight per 100 parts of the silicone rubber base. On this basis, it may be said that useful compositions conforming with the invention may be produced using from 20 to 100 parts of sodium silicate and from 5 to 20, more preferably 8 to 12, parts of the higher melting inorganic mineral compound.

The reason for the stated preference of nickelous oxide as the higher melting inorganic component resides in the fact that the composition produced on combustion of the vulcanized formulation is somewhat superior in point of rigidity and tendency to crack or craze. This is particularly so where the maximum temperatures reached during the combustion lie between the kindling temperature of the rubber and 1,400°F. The nickelous oxide provides excellent ceramic structure; throughout such range and these structures hold through temperatures upwards of 5,000° to 6,000° F.

The catalytic vulcanization of the formulation including the sodium silicate and the higher melting mineral compound may be effected in accordance with conventional practice. Thus, a peroxide catalyst, such as 2,4-dichlorobenzoyl peroxide, is normally used. The catalyst is best added as a dispersion in a silicone fluid. To prevent premature vulcanization, the dispersion should not be milled-in until the intermixing of the other materials (when carried out on hot rolls) is complete and the rolls have cooled. The vulcanization of the mixture including the catalyst can be carried out using conventional equipment.

It is to be understood that in addition to the sodium silicate and higher melting mineral compound, the formulation subjected to vulcanization may include one or more additional ingredients which are functional. Thus, materials of the nature of fillers of various particle size may be added to increase or decrease the porosity of the combustion product or to insure that the volume occupied by the combustion product will be as required by the particular application.

Various aspects of the invention are illustrated by the examples below. These are not to be taken as in any way limitative of the invention.

EXAMPLE 1

In this experiment, a silicone rubber base of the following formulation was employed:

| | | |
|---|---|---|
| A. | A trimethylsiloxy end-blocked gum copolymer of 96 mol percent dimethylsiloxane units and 2 mol percent methylvinylsiloxane units (Williams plasticity = 0.110 inch) | 100 parts |
| B. | A reinforcing fumed silica filler having an average surface area of 325 square meters per gram | 40 parts |
| C. | 50 centipoise OH-terminated dimethylsiloxane fluid (for softening) | 13 parts |
| D. | Diphenylsilanediol (antistructure additive) | 2 parts |

100 parts of the above base was milled with:

| | | |
|---|---|---|
| E. | Anhydrous water-soluble sodium silicate powder (Na/Si ~ 1:1) capable of passing a 200 mesh screen | 30 parts |
| F. | Finely ground quartz | 30 parts |
| G. | Nickelous oxide | 10 parts |
| H. | 2,4-dichlorobenzoyl peroxide dispersed in an equal portion by weight of a 1000 cs. silicone oil | 2 parts |

The milled mixture was extruded as a sheet having a thickness of about 1 centimeter. Thereafter it was oven-cured for 10 minutes at 240° F. The resulting rubber was later exposed to dry heat at 1,400° F. until combustion thereof was complete. This gave a rigid, impact resistant structural ash occupying essentially the same volume as the rubber.

EXAMPLE 2

Here a fluid silicone rubber gum was employed in order to obtain a flowable paste compound. The formula was as follows:

| | | |
|---|---|---|
| A. | A trimethylsiloxy end-blocked gum copolymer of 98.5 mol percent dimethylsiloxane units and 1.5 mol percent methylvinylsiloxane units (312,000 centistokes) | 100 parts |
| B. | Sodium metasilicate powder capable of passing 200 mesh | 30 parts |
| C. | Finely ground quartz | 30 parts |
| D. | Nickelous oxide | 10 parts |
| E. | 2,4-dichlorobenzoyl peroxide dispersed in an equal portion by weight of a 1000 cs. silicone oil | 2 parts |

The above mixture was spread coated on a woven glass fabric to a thickness of 0.010 inches. This coated fabric was then oven-cured for 30 minutes at 400° F. to obtain a flexible and conformable elastomer coated membrane. Further exposure to dry heat at 1,400° F. gave a rigid glass fabric-reinforced structural ash occupying essentially the same volume as the original rubber coated fabric.

EXAMPLE 3

A formula identical to that described in Example 1 was employed except that the finely ground quartz was omitted. After combustion was completed at 1,400° F., the volume of the residue was about one fifth less than that of the composition fired.

EXAMPLE 4

In this experiment, the action of a high-surface-area reinforcing filler (325 square meters per gram) in the composition was examined, as was the effect of allowing such fillers to soak in the carrier (silicone gum) prior to curing. Except for the reinforcing filler (CAB-O-SIL HS-5) each formulation accorded with Example 1. Results:

| Formulation | A | B | C |
|---|---|---|---|
| CAB-O-SIL | none | 40 pts. | 40 pts. |
| Soak or "wet cut" prior to curing | 7 days | 7 days | none |

Each of the three specimens A, B, and C was press vulcanized to the elastomeric state at 240° F. into a ¼ inch × 3 inch diameter disc, then fired at 1,400° F. until combustion was complete. In the case of A, the residue was quite rigid and had the appearance of a shredded sponge with a very irregular surface. Its volume was approximately 10 percent greater than that of the original cured disc. Minor stress cracking on the periphery occurred incident to the cooling from 1,400° F. to room temperature.

In the case of B, the volume of the rigid residue after 1,400° F. was approximately equal to that of the original disc. Again, slight stress cracks around the periphery occurred while cooling to room temperature. The surface was smooth with good detail including the clearly defined sample number originally molded in during vulcanization of the specimen.

In the case of C, the fired residue occupied approximately 15 percent more volume than the disc before firing. No stress cracking occurred while cooling and the surface was smooth and regular. Internal examination of the fired specimen revealed a larger pore structure than was the case with A or B. The specimen exhibited high impact strength.

EXAMPLE 5

A composition formulated as per Example 1 was placed, as a sheet, directly into a 1,400° F. oven. In progression, the sample first went through vulcanization, then combustion. The resultant residue was similarly rigid and occupied essentially the same volume as before firing. This demonstrated that it is unnecessary to vulcanize the mass and cool prior to firing. Thus, fired-in-place applications are perfectly feasible.

EXAMPLE 6

Other mineral compounds useful in place of, or in addition to, nickelous oxide include zinc oxide, cryolite, aluminum trifluoride, manganese oxide, chromium oxide, titanium dioxide, calcined alumina, nepheline syenite, lithium aluminum silicate, and ceramic fluorspar.

Any of these compounds contribute integrity in the ash during or after exposure to temperatures between 500° F. and 1,000° F. In this range, sodium silicate alone will not cause the ash residue to rigidify and consequently the mass is friable after combustion.

The invention claimed is:

1. A ceramic composition having structural integrity which is obtained by heating a heat curable composition containing a trimethylsiloxy end-blocked gum copolymer consisting essentially of chemically combined dimethylsiloxane units and methylvinylsiloxane units, a peroxide catalyst and from about 20 to about 100 parts by weight based on 100 parts by weight of the gum copolymer of sodium metasilicate and from about 5 to about 20 parts by weight based on 100 parts by weight of the gum copolymer of an inorganic mineral compound having a melting point higher than sodium metasilicate to a combustion temperature of from about 500° F. to about 6,000° F.

2. The composition of claim 1 wherein the inorganic mineral compound is nickelous oxide.

3. A method for preparing a ceramic composition having structural integrity which comprises heating a composition containing a trimethylsiloxy end-blocked copolmer consisting essentially of chemically combined dimethylsiloxane units and methylvinyl siloxane units, a peroxide catalyst, from about 20 to about 100 parts by weight based on 100 parts by weight of the gum copolymer of sodium metasilicate and from about 5 to about 20 parts by weight based on 100 parts by weight of the gum copolymer of an inorganic mineral compound having a melting point higher than sodium metasilicate to a combustion temperature of from about 500° F. to about 6,000° F.

4. The method of claim 1 wherein the composition is first heated to the vulcanization temperature and then heated to the combustion temperature of the composition.

5. The method of claim 4 wherein the composition is heated to a vulcanization temperature of from about 240° F. to about 400° F.

6. The method of claim 4 wherein the composition is heated to a combustion temperature of from about 500° F. to 1,400° F.

* * * * *